United States Patent [19]

Woodnutt

[11] Patent Number: 4,508,997

[45] Date of Patent: Apr. 2, 1985

[54] LIGHTING CONTROL SYSTEM

[75] Inventor: John P. Woodnutt, London, England

[73] Assignee: Delmatic Limited, London, England

[21] Appl. No.: 485,244

[22] Filed: Apr. 15, 1983

[30] Foreign Application Priority Data

May 10, 1982 [GB] United Kingdom ............... 8213499

[51] Int. Cl.³ ............................................. H05B 37/02
[52] U.S. Cl. ..................................... 315/360; 315/210; 315/313; 315/321
[58] Field of Search ................ 315/313, 321, 360, 210; 307/96, 157

[56] References Cited

U.S. PATENT DOCUMENTS

| | | | |
|---|---|---|---|
| 1,962,335 | 6/1934 | Wensley | 307/96 |
| 2,976,526 | 3/1961 | Fialkoff | 340/322 |
| 3,488,558 | 1/1970 | Grafton | 315/360 |
| 3,584,257 | 6/1971 | Adams | 315/360 |
| 4,338,562 | 7/1982 | Terwilliger | 315/360 |

FOREIGN PATENT DOCUMENTS

| | | |
|---|---|---|
| 2412928 | 7/1979 | France . |
| WO80/02083 | 10/1980 | PCT Int'l Appl. . |
| 453584 | 6/1935 | United Kingdom . |
| 803588 | 10/1958 | United Kingdom . |
| 1193966 | 6/1970 | United Kingdom . |
| 1225617 | 3/1971 | United Kingdom . |

OTHER PUBLICATIONS

The Highway Code, (1978), p. 9.

Primary Examiner—Harold Dixon
Attorney, Agent, or Firm—Robert F. O'Connell

[57] ABSTRACT

Lights (LP) are controlled by a control unit (CU) which, in response to a remotely and/or automatically generated signal (MASTER OFF), interrupts the lighting temporarily (preferably by repeatedly flashing them on and off) to provide a warning and switches off the lighting after a delay period unless inhibited by a local switch (S1).

2 Claims, 2 Drawing Figures

LIGHTING CONTROL SYSTEM

The present invention relates to lighting control system.

For many applications, it is desirable to provide for automatic and/or remote switching off of lighting, for example in offices and factories. The present invention aims to provide such a system in which the user is given a warning that switch-off is imminent, and the opportunity to override it.

According to the present invention there is provided a lighting control system comprising remotely and/or automatically operable control means to interrupt the lighting temporarily to provide a warning and to switch off the lighting after a delay period, and manually operable local switching means actuable to inhibit the switching off.

The warning and delay give the user the opportunity to reset the system if he wishes the lighting to remain on. Preferably the warning consists of repeated interruption of the lighting, for, if desired, the entire delay period. This has the advantages that the warning is made more definite and that the user is aware, from the fact that interruption has ceased, that the system has been successfully reset.

One embodiment of the invention will now be described, by way of example, with reference to the accompanying drawings, in which.

Figure 1:
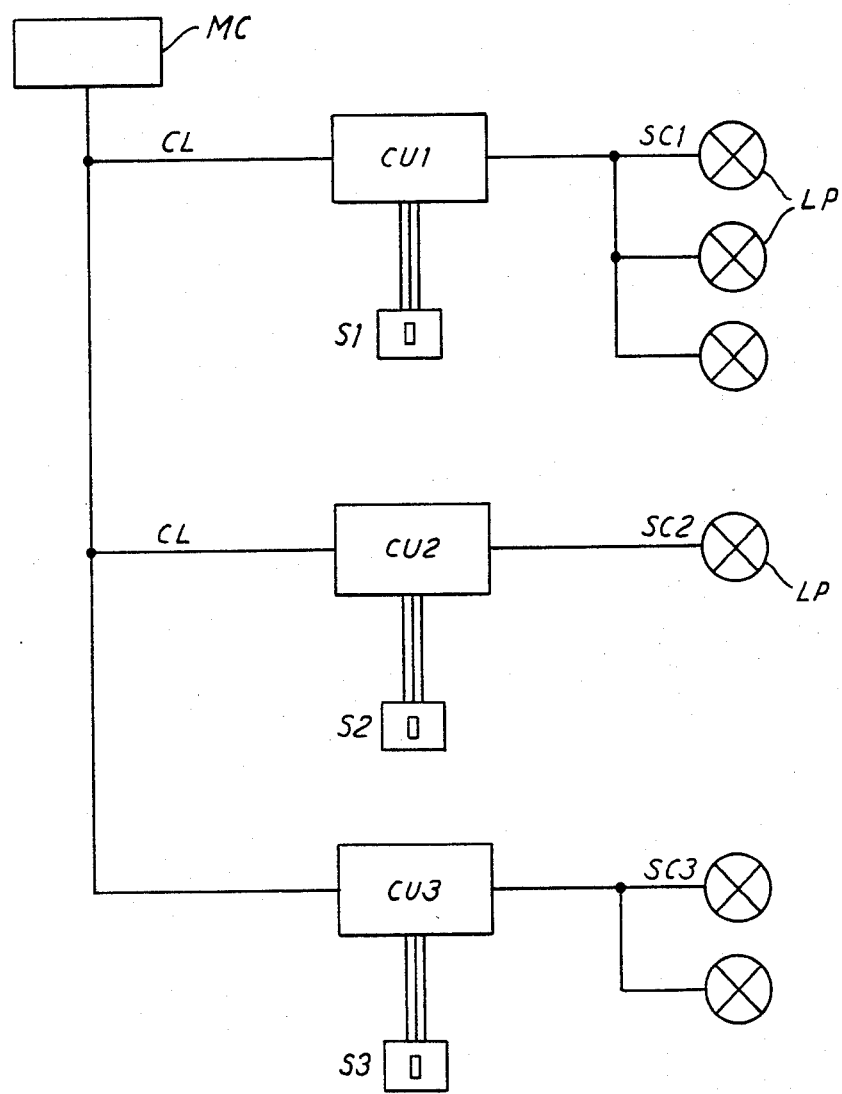
FIG. 1 is a block diagram of a lighting control system.

Referring to FIG. 1, a lighting system, e.g. for an office block, has lighting sub-circuits of which only three SC1–SC3 are shown, although in most practical situations there would be more than this. Each sub-circuit supplies one or more lighting points LP. Each sub-circuit is controlled by a respective control unit CU1, CU2, CU3: with an associated switch S1, S2, S3. Electrical power supplied to the control units are conventional and not shown in the drawings.

Each room or area may have an associated control unit and switch feeding the lighting within that area. One control unit may feed more than one sub-circuit, if desired. Alternatively, an area may have lighting in different parts of the area controlled separately by separate control units, (that is to say, operating independently, although they might be located in a single enclosure), or lighting in more than one area may be commonly controlled.

In normal use, the lights are switched on and off as required by the users, by means of the switches S1, S2, S3. However, the control units CU are all linked by control lines CL to a master control unit MC, which can transmit a "master off" signal in order that the lighting may be switched off remotely from a central point, e.g. at the end of the working day under manual or automatic control. Provision may optionally be included for a "master on" signal to switch the lighting on again.

Upon commencement of the master off signal, each control unit CU warns the users in the area which it covers, by repeatedly switching the lighting which is on, off and on. In the absence of human intervention, this continues for the duration of the master on signal, typically 2 minutes at the end of which the lighting is switched off by the control units CU. If, however, a person working in the relevant area wishes the light to remain on, he operates the switch or switches serving his area (say, S1) to the on position: the control unit responds by ceasing to flash the lights, thus providing the user with an acknowledgement that the system has been reset, and inhibiting the switching off of the lights upon termination of the master off signal.

Figure 2:
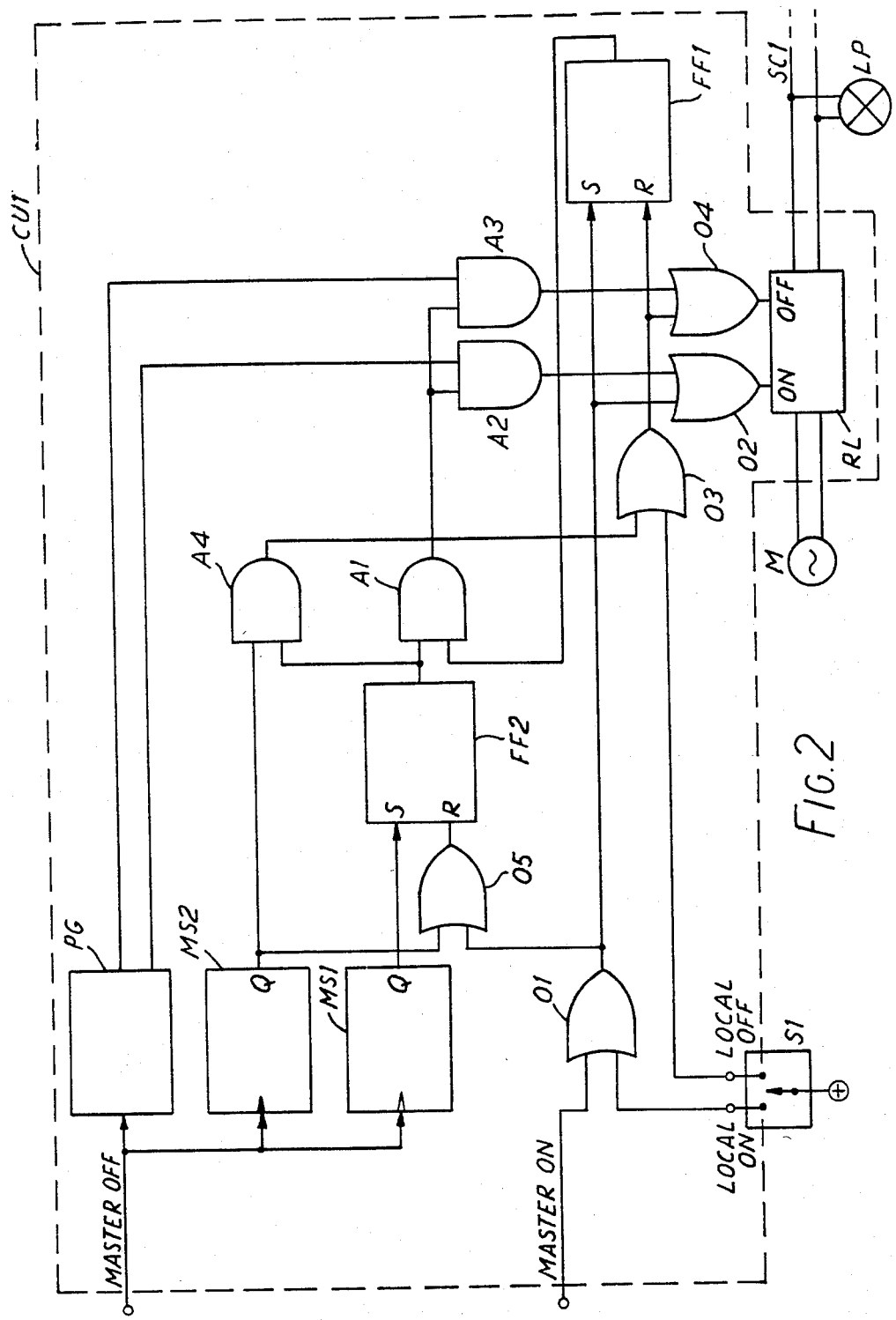
FIG. 2 is a block diagram of the control unit employed in the system of FIG. 1.

The detailed operation of the control unit CU1 will now be described with reference to FIG. 2: the other control units CU2, CU3 being identical. Power to the sub-circuit SC1 from the mains supply M is controlled by a bistable relay RL or equivalent device such as a thyristor control unit.

The switch S1 is a three-poosition switch which when operated momentarily to the "on" position supplies a logic 1 signal via OR gates 01, 02 to the ON input of the relay RL. Similarly, switching to the local "off" position supplies a logic 1 via OR gates 03, 04 to the OFF input of the relay, to switch the lights LP off. The "master on" signal referred to above is applied to a second input of the OR gate 01 and thus has the same effect as operation of the local switch S1 to the "on" position. The outputs of the OR gates 01, 03 are also connected to the set and reset inputs of a bistable flip-flop FF1 which is thus in the set state when the lights are set to the "on" position.

The function of flip-flop FF1 is to memorise the pre-set position of the lights during the warning "off" period when they are being pulsed off/on.

The master off signal consists of a single pulse of 2 minutes duration. Monostable circuits MS1, MS2 are triggered by the leading and trailing edges of the master off pulse to produce, at their outputs Q, 20 ms pulses. The output of the monostable MS1 is connected to the set input of a second bistable flip-flop. If the lighting circuit is in the operating condition, the flip-flop FF2, so that the start of the master off signal sets this flip-flop FF1 will be in the set state, and thus and AND gate A1 whose inputs are connected to the outputs of the two flip-flops enables further AND gates A2, A3. These enable the passage of antiphase repetitive pulses from a pulse generator PG (enabled by the master off pulse), via OR gates 02, 04 to the ON and OFF inputs of the relay RL to cause the lights to flash. The pulses typically have an off time of 1 second in every 20 seconds.

Unless the switch S1 is operated (or a master on signal is generated) the warning pulses will continue for the whole of the period (i.e. 2–3 minutes). At the end of this period the repetitive pulses will cease and the 20 ms pulse from the monostable MS2 passes via an AND gate A4 (enabled by the output of FF2 which is in the set state) and the OR gate 03 to reset flip-flop FF1 and (via OR gate 04) switch the relay RL to the off state; it also resets FF2 via a further OR gate 05.

If, however, the local switch S1 is pressed on, or a master on signal is generated, the flip-flop FF2 is reset (via 05) thereby disabling AND gates A1, A2 and A3 to suppress the repetitive pulses, and lighting ciruit is switched on (if in the pulsed-off condition). Resetting of FF2 disables the AND gate A4 and thus inhibits the switch-off at the end of the master off pulse. If the local switch is operated OFF, the lighting circuit will be switched off (if in the pulsed-on condition) and the flip-flop FF1 reset, disabling the AND gates A1, A2, A3 and hence the warning pulses.

As mentioned above, control units for adjacent areas could be co-sited, in which case the pulse generator PG and monostables MS1, MS2 could be common to two or more control units.

Should the lighting be off when the master off signal arrives, the flip-flop FF1 will be in the reset state so that no warning pulses will be initiated.

As described, the warning period is determined by the duration of the master off signal. However, this is not essential; the master off signal could be a brief pulse with the duration of the warning being determined locally at the control unit.

The master off signal is shown as deriving from a single source, but there could be more than one such signal, for example for providing different switch-off times for different areas.

I claim:

1. A lighting system comprising
a plurality of lighting sub-circuits;
a master control;
local control units each arranged for operation in response to a signal from the master control to temporarily interrupt the lighting on one or more lighting sub-circuits associated with the respective local control unit during a delay period, to provide a warning, and to switch off the lighting at the end of the delay period; and
a manually-operable switch associated with each local control unit, and actuable during the delay period to inhibit the switching off of said one or more lighting sub-circuits under the control of the respective local control unit.

2. A lighting system according to claim 1 wherein each said local control unit is arranged to provide a warning on the one or more lighting sub-circuits associated with it consisting of repeated interruption of the lighting during some or all of said delay period.

* * * * *